Feb. 3, 1970    H. L. FREEMAN ET AL    3,493,087
HOIST LOAD BRAKE

Filed July 9, 1968    2 Sheets-Sheet 1

INVENTORS
J. P. TRUEMPER
and H. L. FREEMAN

BY

ATTORNEYS

INVENTORS
J. P. TRUEMPER
and H. L. FREEMAN

BY

ATTORNEYS

United States Patent Office 3,493,087
Patented Feb. 3, 1970

3,493,087
HOIST LOAD BRAKE
Harvey L. Freeman, Brinkley, and John P. Truemper, West Helena, Ark., assignors to Eaton Yale & Towne Inc., Cleveland, Ohio, a corporation of Ohio
Filed July 9, 1968, Ser. No. 743,561
Int. Cl. F16d 13/76, 13/72, 13/60, 13/74
U.S. Cl. 192—16
8 Claims

ABSTRACT OF THE DISCLOSURE

The ratchet disc of a hoist Weston mechanism has bonded to its opposed sides a friction material formed with extremely smooth surfaces and having substantially the same coefficient of friction during both static and dynamic operation. The surfaces are formed with grooves for a flow of cooling oil, and engage surfaces that are finished to 10 microinches on the pressure disc and the hub of the mechanism.

---

This invention relates to a hoist, and more particularly a hoist of the type in which a Weston mechanism is utilized as a load brake for holding a load in elevated position and for controlling the lowering of the load. The standard Weston mechanism is very old in the art and has been found to be the most effective mechanism that can be used for the particular purpose. Nevertheless, a standard Weston mechanism very frequently will not permit the smooth lowering of a load, particularly in a motorized hoist. Our invention utilizes the basic principle of a Weston mechanism, but departs from the direction taken by the attempts of earlier designers, and makes possible a smoothly controlled lowering of the load on a motorized hoist.

As will be understood by those skilled in the art, the usual Weston mechanism utilizes a drive shaft having a threaded portion on which is mounted a threaded hub. Freely rotatable about the shaft are a holding ratchet and a friction disc at one side or both sides of the ratchet. In normal operation, there is pressure holding the friction discs always in frictional engagement between the ratchet, the hub, and a pressure disc that is fixed to the shaft. When the hub is rotated in a load lifting direction, it will tend to move on its threads relatively to the shaft, increasing the pressure and binding the hub, the ratchet, the friction discs and the pressure disc so that they rotate as a single unit. The hub is power driven in a motorized hoist and, by rotating the shaft, acts to lift the load. A hoist of the particular class is well illustrated in the Schroeder Patent 2,244,221.

The ratchet is controlled by a pawl so that it can rotate only in a direction corresponding to that direction of rotation of the shaft which brings about a lifting of the load. When the hub is not driven, it will be appreciated that the load tends to rotate the shaft and the hub in the reverse direction that is necessary to permit lowering of the load. Of course, that tendency also applies the pressure that binds the shaft, the hub and the ratchet together with the friction discs and the pressure disc, so that the ratchet and its pawl then holds the load against lowering movement.

In order to lower the load, the hub of the Weston mechanism is rotated by the motor in a lowering direction. This acts to lessen the binding pressure so that the mechanism no longer is bound as a unit, and the load can move downwardly because the shaft now can rotate relatively to the ratchet. This lowering operation of the Weston mechanism has been most difficult to control properly, and is the particular concern of our invention.

Thus, when the hub of the usual Weston mechanisms starts to rotate in load lowering direction, it very often acts momentarily to remove the frictional engagement that always is necessary between the ratchet and the other parts of the mechansm. In other words, there is actual release and the load starts to drop. Thereby the load causes the shaft of the mechanism to rotate faster than the hub is rotated by the motor, and there again will be a binding of the shaft relatively to the ratchet. Naturally, the binding does not offer the frictional control that is necessary, the shaft and ratchet again being bound as a unit. That is followed again by release so that the load is lowered through a series of gripping and releasing actions. When the load is to be lowered very slowly, as must often be done, and safely, the gripping and releasing actions will follow closely on one another and it is virtually impossible to obtain smooth lowering.

Moreover, the binding may be so severe as to require considerable motor torque, sometimes of a magnitude that will cause the load to be released for movement beyond control for a considerable distance.

Many in the art have long sought to develop a construction that will effectively control the lowering movements of a Weston mechanism, but so far as we know, they have not been successful. Generally, the principles that have been applied were merely those that may be successful on other types of friction brake or clutch, and there has been no concept of means that will contribute fully satisfactory operation of a Weston mechanism. Possibly, as we believe, the difficulty in finding a solution has been due to the fact that frictional pressures in a Weston mechanism will vary tremendously depending upon load, yet, when operating with any particular load, those pressures must be under very gradual control while changing a relatively small amount, all while the pressure is maintained so that there can be no release. In any event, we are aware of no earlier Weston mechanism that is not prone to operate with erratic gripping of the load and the uneven lowering movement that results therefrom, particularly when the hoist is motor driven. Our contribution to the Weston mechanism eliminates almost completely the erratic gripping action to which we have alluded. It also eliminates the extraordinarily effective binding of the various parts that may require great force to release the shaft from the ratchet to permit lowering.

As a feature of our invention, we first eliminate individual braking or friction discs. We do utilize a drive shaft, on which is threaded the hub of the Weston mechanism, with a ratchet disc and a pressure disc that is fixed to the drive shaft and against which the ratchet is forced by the hub. Through the elimination of friction discs, we bring about a binding action through means of only a single movable element in addition to the hub. In other words, nothing moves relatively to the drive shaft except the hub threaded on the drive shaft, and the ratchet controlled by a pawl for holding the load. The elimination of friction discs is important because it eliminates one of the elements contributing to the quick binding and severe interlock of the prior art Weston mechanisms.

As a further important feature, we utilize an extremely smooth frictional material that is bonded to our ratchet so as to form integral side surfaces on each side of the ratchet. As a part of this feature, we utilize material offering static and dynamic coefficients of friction that are substantially equal.

As a third feature of our invention, the hub of our hoist has a surface that is ground to considerable smoothness, preferably having a 10 microinch finish, so that its engagement with the friction surface of the ratchet can become extremely close, and effective to yield frictional binding while yet permitting easy and smooth operation while the frictional pressure is lessened. The pressure disc against which the other side of the ratchet is pressed is similarly finished, and similarly permits the engagement of the parts and the very easy and smooth frictional effect that is necessary for smooth lowering of the load.

As a more detailed feature, we form at least one side surface of the ratchet with a series of grooves. Preferably, the grooves merely extend in the brake material that forms the ratchet surfaces, so that the material can be bonded continuously to the side area of the ratchet body. Through this construction, the heat brought about by the frictional engagement of the ratchet is dissipated into the grooves and outwardly thereof into a bath of oil, where the construction of the hoist permits the use of such a bath of oil.

We have thus outlined rather broadly the more important features of our invention in order that the detailed description thereof that follows may be better understood, and in order that our contribution to the art may be better appreciated. There are, of course, additional features of our invention that will be described hereinafter and which will form the subject of the claims appended hereto. Those skilled in the art will appreciate that the conception on which our disclosure is based may readily be utilized as a basis for the designing of equivalent structures, and it is important to recognize that our detailed description merely sets forth structure that we prefer for carrying out the several purposes of our invention.

Figure 1:
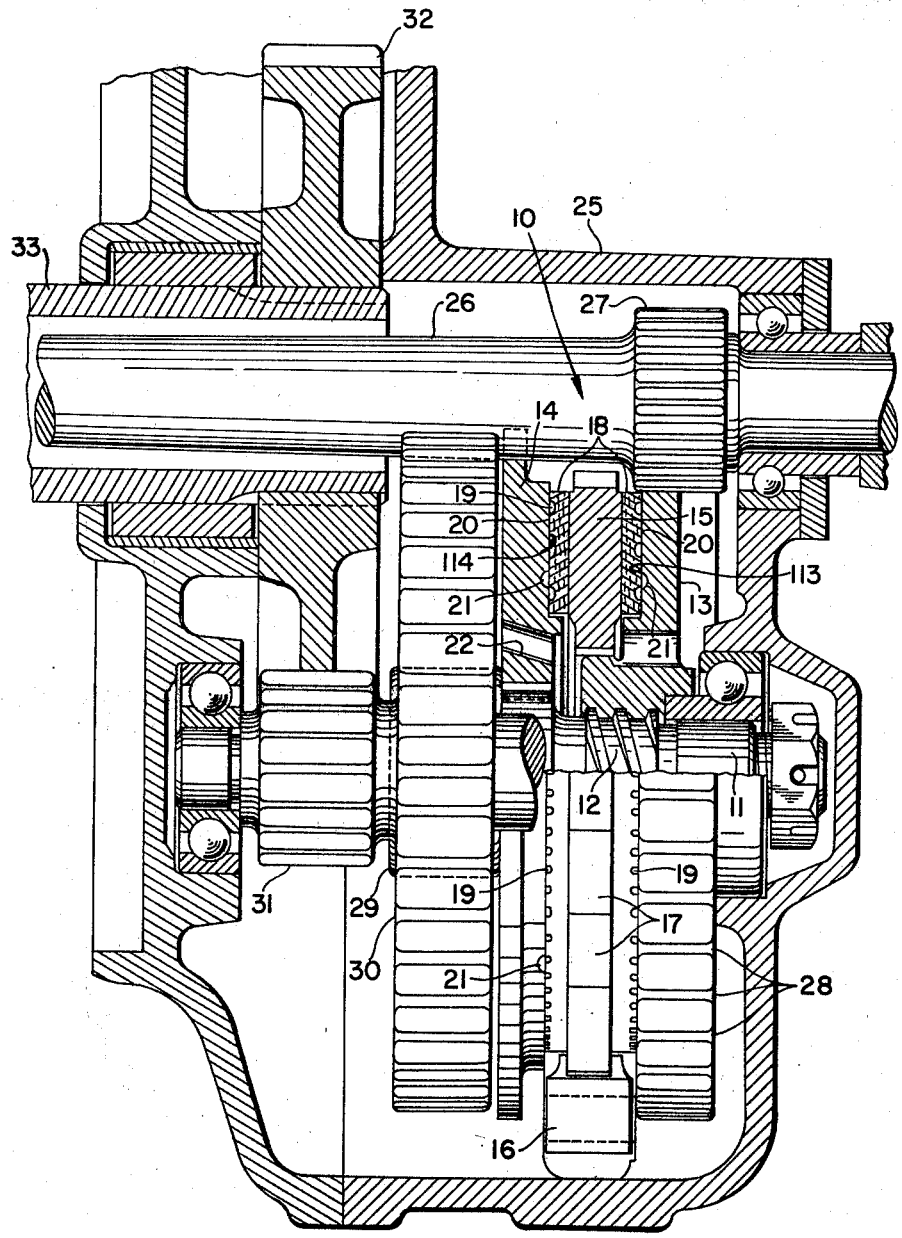
FIGURE 1 shows a sectional view of a portion of a hoist utilizing our invention.

Referring now more particularly to FIGURE 1 of the drawings, we show a Weston mechanism 10 having a basic arangement that is standard, including a rotating shaft 11 formed with a threaded portion 12, a hub 13 threaded on the portion 12, a pressure disc 14 integrally mounted on shaft 11, and a ratchet disc 15 assembled intermediate hub 13 and pressure disc 14 and mounted for rotation relatively to drive shaft 11. A pawl device 16 engages teeth 17 on the periphery of ratchet disc 15 and holds that disc against rotation in one direction while leaving it relatively free to rotate in an opposed direction, all as will be understood by those skilled in the art.

In the novel concept of our invention, we equip opposed faces of ratchet disc 15 with portions 18 of a friction material of a kind that has substantially equal coefficient of static and dynamic friction, and that will remain stable when subjected to considerable heat. Friction materials of that kind are available, an example being a material called R-500 B by its maker, Raybestos-Manhattan, Inc., of Bridgeport, Conn. That material comprises asbestos with a resin binder, and has a coefficient of friction which lies between .1 and .2. The particular coefficient remains substantially the same during both static and dynamic operation.

Figure 2:
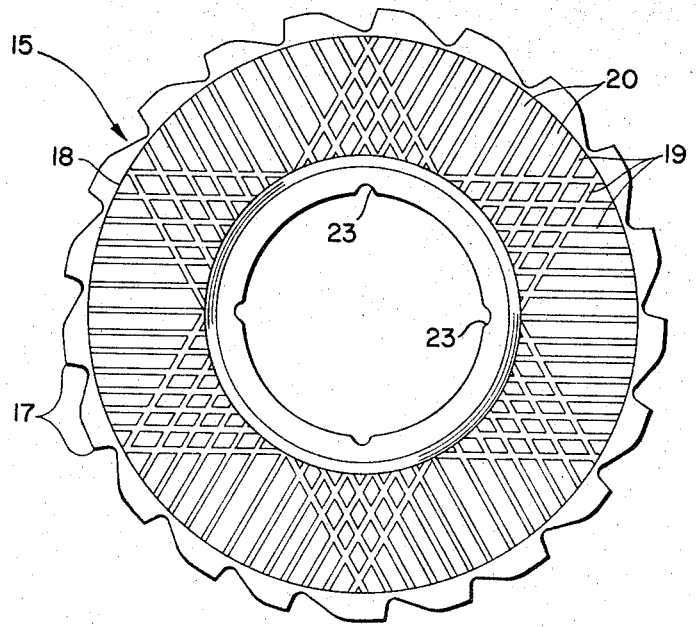
FIGURE 2 shows a side view of the ratchet disc.

We prefer to utilize the friction material portions 18 in a flat circular shape extending about the axis of the drive shaft 11, as will be seen when considering FIGURE 1 with FIGURE 2. We particularly bond each portion 18 to a face of ratchet disc 15, forming the bond so as to extend throughout the extent of the material on the disc face. We have found an epoxy adhesive satisfactory for the purpose. Where the mechanism 10 is to run in a bath of oil, we form the outer side of each portion 18 with a series of grooves 19 that will permit a cooling flow of the oil. However, the depth of those grooves 19 preferably does not extend through the thickness of the friction material 18, and therefore, permits the material bond to extend continuously on the ratchet disc face. The outer side of each portion 18 of the material has a smooth finish and presents over its extent a friction surface 20 that is extremely smooth, though interrupted by the grooves 19. In effect, then, each potrion 18 is an integral part of ratchet disc 15 and forms that disc with a side surface that actually is an extremely smooth friction surface.

The hub 13 and pressure disc 14 have corresponding pressure surfaces 113 and 114 engaging the ratchet friction surfaces 20, and in our invention we grind those pressure surfaces 113, 114 to a micro finish. More particularly, we have found that our invention will offer most effective operation when the surfaces 113, 114 are finished to 10 microinches, by which we mean a maximum surface variation in one direction from a theoretical surface. Of course, it may conceivably be found that a slightly different degree of finish will operate well in some cases. We also prefer that the surfaces 113, 114 and the friction surfaces 20 be flat rather than another shape, such as tapered or cupped.

Figure 3:
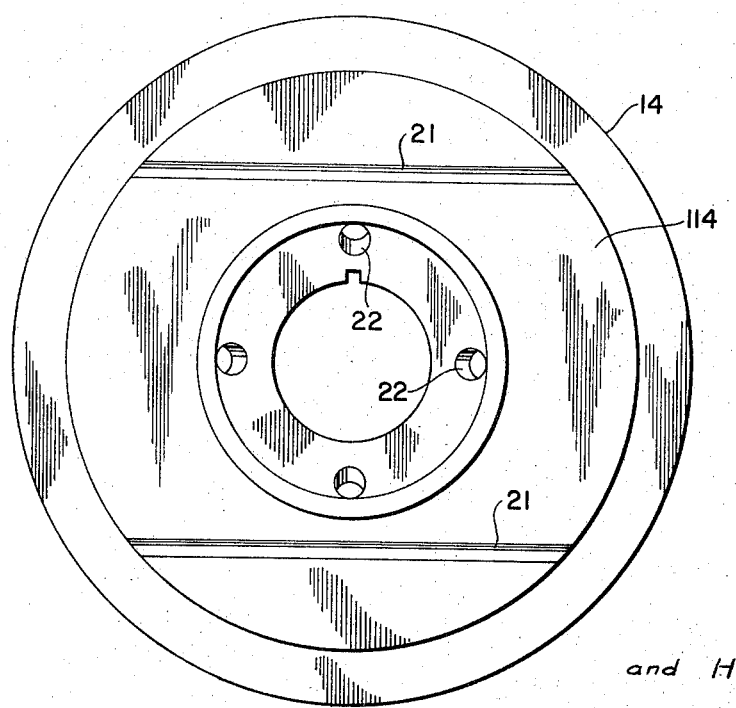
FIGURE 3 shows a side view of the drive shaft pressure disc.

In order to induce a better flow of cooling oil, grooves 21 may be formed in the pressure surfaces 113, 114. Also, hub 13 and disc 14 may be formed with oil passages 22, FIGURES 1 and 3, and ratchet disc 15 may have oil passages 23, FIGURE 2.

Merely for purposes of disclosure, we show the Weston mechanism 10 on a hoist constructed like that shown in the Schroeder patent to which we have referred earlier. Thus, drive shaft 11 is mounted to rotate on bearings in a casing 25, and a hoist motor shaft 26 is formed with a pinion 27 acting through gearing (not shown) that meshes with gear teeth 28 formed on the periphery of the hub 13, for rotating the hub in opposed lifting and lowering directions. Also, drive shaft 11 has an integral pinion 29 acting through gearing 30, 31 to drive a gear 32 that is splined on a hollow shaft 33 forming the load shaft of the hoist. The operations of the hoist parts will be well understood by those skilled in the art, but it will be well to point out here that the hoist load shaft 33 will tend to rotate in lowering direction. That tendency should maintain controlled frictional pressures relatively to the ratchet disc, but does not always do that in the Weston mechanisms designed up until the present time, there being the erratic binding or gripping and releasing actions that we have already described.

Through the novel contribution of our invention, we are able always to maintain the pressure surfaces 113, 114 in a controlled pressure relation to the friction surfaces 20 on the ratchet disc, very effectively controlling the binding and frictional action. By that control, we make it possible to achieve smooth and controlled lowering movements while utilizing a Weston mechanism on a hoist. The harsh binding of the prior art is not present and it actually becomes possible to obtain frictional control of the load whereas in the prior art, it can be said that the load alternately is controlled and not controlled whatsoever by the Weston mechanism.

We believe, therefore, that the very considerable value of our novel hoist load brake will be understood, and that the merits of our invention will be fully appreciated by those skilled in the art.

We now claim:

1. In a hoist of the class in which there are in combination a load shaft having fixed thereto a pressure disc or the like, a portion of said shaft being threaded, a hub threaded on said threaded shaft portion and having a pressure surface in opposed relation to the pressure disc, a ratchet disc assembled intermediate said pressure disc and said pressure surface of the hub and rotatably mounted relatively to said shaft, there being friction material through which said pressure disc and hub pressure surface coact with the ratchet disc, means for rotating said hub and effective for pressing said hub endwise on the threaded portion of the shaft so as to bind said hub, ratchet disc, and shaft to one another as a unit, and alternately to control frictional pressures permitting the hub and shaft to rotate relatively to the ratchet disc, and means holding said ratchet disc against rotation in one direction while allowing rotation thereof in a reverse direction, the improvement that comprises friction material having a coefficient of static friction and a coefficient of dynamic friction that are substantially the same, including portions of said material bonded to oppose faces of said ratchet disc and formed with extremely smooth friction surfaces in effect contributing integral side surfaces of the ratchet disc, those side surfaces being held in pressure relation to a surface of said pressure disc and to said pressure surface of said hub during all operations of the hoist, and said pressure disc surface and hub pressure surface having a microinch finish, said combination acting by friction that is controlled during operations of the hoist and that effects substantially no frictional interlocking between the hub, ratchet disc, and drive shaft when bound to one another as a unit.

2. A construction as set forth in claim 1, in which each said portion of the friction material is bonded throughout its entire extent relative to a face of the ratchet disc.

3. A construction as set forth in claim 2, in which each said portion of the friction material has a circular shape extending continuously about the axis of the ratchet disc.

4. In the combination of claim 1, the feature that at least one of the surfaces that are held in pressure relation between the ratchet disc, pressure disc and hub is formed with grooves for a flow of cooling oil.

5. In the combination of claim 1, the feature that said pressure disc surface and said hub pressure surface that engage the friction material have a finish on the order of 10 microinches.

6. In the combination of claim 5, the feature that each said portion of the friction material is bonded throughout its entire extent relatively to a face of the ratchet disc.

7. In the combination of claim 6, the feature that each said portion of the friction material has a circular shape extending continuously about the axis of the ratchet disc.

8. In the combination of claim 7, the feature that the smooth friction surfaces of the friction material that are in pressure relation to the pressure disc and to the pressure surface of the hub are interrupted by grooves for a flow of cooling oil.

References Cited

UNITED STATES PATENTS

| | | |
|---|---|---|
| 2,202,137 | 5/1940 | Brown. |
| 2,310,135 | 2/1943 | Cleave _____ 192—16 XR |
| 2,690,245 | 9/1954 | Schroeder _____ 192—16 XR |
| 2,325,917 | 8/1943 | Parker et al. _____ 192—16 |

BENJAMIN W. WYCHE III, Primary Examiner

U.S. Cl. X.R.

188—134; 192—70.14, 113